US012656664B2

(12) United States Patent
Birnbaum et al.

(10) Patent No.: US 12,656,664 B2
(45) Date of Patent: Jun. 16, 2026

(54) CHASSIS FOR MOUNTING MULTIPLE CAMERAS IN AN ELECTRONIC DEVICE

(71) Applicant: Apple Inc., Cupertino, CA (US)

(72) Inventors: Zachary W. Birnbaum, Santa Clara, CA (US); Haitao Xu, Great Neck, NY (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 18/240,648

(22) Filed: Aug. 31, 2023

(65) Prior Publication Data

US 2025/0076742 A1     Mar. 6, 2025

(51) Int. Cl.
G03B 17/56          (2021.01)
G03B 17/12          (2021.01)
G03B 30/00          (2021.01)

(52) U.S. Cl.
CPC ........... G03B 17/561 (2013.01); G03B 17/12 (2013.01); *G03B 30/00* (2021.01)

(58) Field of Classification Search
CPC ........ G03B 30/00; G03B 19/22; H04N 23/51; H04N 23/57; H04M 1/026
See application file for complete search history.

(56) References Cited

U.S. PATENT DOCUMENTS 9,591,215 B1     3/2017  Miller et al.
9,838,600 B1     12/2017 Tam et al.

| | | |
|---|---|---|
| 10,389,858 B2 | 8/2019 | Yu et al. |
| 10,429,722 B2 | 10/2019 | Rho et al. |
| 10,484,582 B2 | 11/2019 | Chen et al. |
| 10,509,194 B2 | 12/2019 | Lee |
| 10,573,776 B2 | 2/2020 | Jan et al. |
| 11,023,994 B2 | 6/2021 | Lin et al. |
| 11,272,082 B2 | 3/2022 | Miller et al. |
| 11,297,237 B2 | 4/2022 | Park et al. |
| 2007/0212058 A1 | 9/2007 | Kawai |
| 2008/0274580 A1 | 11/2008 | Jung |
| 2014/0048997 A1 | 2/2014 | Cheng et al. |
| 2017/0146766 A1 | 5/2017 | Hsu |

(Continued)

FOREIGN PATENT DOCUMENTS

| EP | 2858755 | 9/2017 |
|---|---|---|
| EP | 3606022 | 6/2021 |

(Continued)

*Primary Examiner* — Noam Reisner
(74) *Attorney, Agent, or Firm* — Brownstein Hyatt Farber Schreck, LLP

(57)          ABSTRACT

A camera system for an electronic device is described herein. The camera system may include a chassis configured to receive at least two cameras. The chassis may include a top wall having a first portion and a second portion. The first portion may define a first region of an exterior surface of the top wall having a first surface height and a first opening. The second portion may define a second region of the exterior surface having a second surface height recessed with respect to the first surface height, and further defines a second opening. The second opening may be substantially surrounded by the first region. A first camera may be mounted to the chassis and at least partially extends through the first opening and a second camera may be mounted to the chassis and at least partially extend through the second opening.

18 Claims, 15 Drawing Sheets

200

(56) References Cited

U.S. PATENT DOCUMENTS

| | | | |
|---|---|---|---|
| 2020/0033557 A1* | 1/2020 | Huang | H02K 41/0356 |
| 2021/0029275 A1* | 1/2021 | Choi | G06F 1/1686 |
| 2021/0092261 A1* | 3/2021 | Miller | H04N 23/52 |
| 2022/0188092 A1 | 6/2022 | Liu et al. | |
| 2024/0172353 A1* | 5/2024 | Lee | H04N 23/57 |

FOREIGN PATENT DOCUMENTS

| | | |
|---|---|---|
| EP | 3489091 | 9/2021 |
| WO | WO 21/223830 | 11/2021 |
| WO | WO 22/179998 | 9/2022 |

* cited by examiner

400

4D-4D

*DETAIL A-A*

CHASSIS FOR MOUNTING MULTIPLE CAMERAS IN AN ELECTRONIC DEVICE

TECHNICAL FIELD

Embodiments described herein relate to camera systems for electronic devices. In particular, embodiments described herein relate to a chassis used for mounting and aligning multiple cameras in an electronic device.

BACKGROUND

Cameras are important features of consumer electronics devices such as smartphones, tablets, virtual reality headsets, and computers. Generally, these consumer electronic devices may include multiple cameras having different capabilities (e.g., zoom levels) for a wide variety of applications and user needs. However, the alignment of the cameras with respect to each other may be difficult to achieve due to the difference in sizing in the cameras, tolerances, and the like. Accordingly, it may be desirable to provide a mounting component for the multiple cameras which houses and aligns the cameras with respect to each other while maintaining a small form factor.

SUMMARY

Embodiments described herein relate to a chassis for mounting a first camera and a second camera. The chassis may include a set of sidewalls with a shared sidewall and a top wall. The top wall may have an exterior surface and an interior surface. In some cases, the top wall and the set of sidewalls at least partially define a first cavity configured to receive at least a portion of the first camera and a second cavity configured to receive at least a portion of the second camera. The second cavity may be separated from the first cavity by the shared sidewall. Generally, the top wall may include a first section and a second section. The first section may be positioned on a first side of the shared sidewall and may define a first opening extending through the top wall. The first section may also include a first region of the exterior surface having a first surface height. The second section may be positioned on a second side of the shared sidewall and may define a second opening extending through the top wall. The second section may also include a second region of the exterior surface having a second surface height recessed relative to the first surface height and at least one additional region of the exterior surface having the first surface height.

In some variations, the chassis may also have a first region of the interior surface that is positioned within the first cavity and a second region of the interior surface that is positioned within the second cavity. In some cases, the first region of the interior surface is at a different surface height than the second region of the interior surface. As another example, a thickness of the top wall at the first region of the exterior surface is the same as the thickness of the top wall at the second region of the exterior surface. In some embodiments, second opening extends through the second region of the exterior surface. A distance between a peripheral edge of the second opening and a peripheral edge of the second region may be the same along a perimeter of the second opening.

In some embodiments, the chassis may be configured to mount three or more cameras. In this example, the shared sidewall may be a first shared sidewall. The set of sidewalls may further include a second shared sidewall. The set of sidewalls and the top wall may cooperate to define a third cavity configured to receive at least a portion of a third camera. The third cavity may be separated from the first and the second cavity by the second shared sidewall. The top wall may further include a third section positioned on a first side of the second shared sidewall and may define a third opening extending through the top wall. The third section may include a third region of the exterior surface having a third surface height recessed with respect to the first surface height and at least one additional regions of the exterior surface having the first surface height.

In some cases, each the first and the second cameras may have different lens module heights and may define respective top surfaces. The respective top surfaces of the first and the second cameras may be coplanar.

Embodiments of the present disclosure may include a camera mounting system having a chassis, a first camera, and a second camera. The chassis may include a top wall which defines a first opening, a second opening, and an exterior surface and an interior surface opposite the exterior surface. The exterior surface may define a plurality of discontinuous regions having a first surface height and a recessed region having a second surface height. The second surface height may be recessed with respect to the first surface height and the second opening may be positioned within the recessed region. The first camera may be positioned to at least partially extend through the first opening. The second camera may be positioned to at least partially extend through the second opening.

In some cases, the first camera may include a first lens module having a first height and extending through the first opening. The second camera may include a second lens module having a second height and extending through the second opening. The first height may be different from the second height. The first camera and the second camera may be positioned such that a top surface of the first lens module is coplanar with a top surface of the second lens module.

The camera system may also include a housing assembly. The housing assembly may have a first cover window positioned over the first camera and a second cover window positioned over the second camera. In some examples, a respective top surface of the first and second cover windows are coplanar.

In some embodiments, a first foam piece may be positioned over the recessed region; and one or more foam pieces, separate from the first foam piece, may positioned over each region of the plurality of discontinuous regions. An exterior surface of the first foam piece and respective exterior surfaces of the one or more foam pieces may be coplanar. In some cases, the interior surface of the chassis defines a first region of the interior surface opposite the recessed region and a second region of the interior surface opposite a first discontinuous region of the plurality of discontinuous regions. The second region of the interior surface may be recessed with respect to the first region of the interior surface. As an example, the first opening is positioned within a first discontinuous region of the plurality of discontinuous regions. In some cases, the first region and the discontinuous regions have a common surface finish.

Other variations described herein are directed to a camera system with a chassis, a first camera, and a second camera. The chassis may be configured to receive at least two cameras. The chassis may include a top wall that has a first portion and a second portion. The first portion may define a first region of an exterior surface of the top wall having a first surface height and a first opening. The second portion may define a second region of the exterior surface having a second surface height recessed with respect to the first surface height and a second opening. The second opening may be substantially surrounded by the first region. The first camera may be mounted at least partially within the chassis and may at least partially extend through the first opening. The second camera may be mounted at least partially within the chassis and may at least partially extend through the second opening.

In some cases, the first region fully surrounds the second region.

The camera system may also include a housing assembly. The housing assembly may have a first window positioned over the first camera and a second window positioned over the second camera. The housing assembly may define a first cavity having a first end defined by the first window. The first cavity sized to receive a portion of the first camera that extends through the first opening. The housing assembly may also define a second cavity having a second end defined by the second window, the second cavity may be configured to receive a portion of the second camera that extends through the second opening.

In some embodiments, the first camera has a first lens module having a first height. The first lens module may define a first top surface of the first camera. The second camera has a second lens module having a second height, different from the first height. The second lens module may define a second top surface of the second camera. In some embodiments, the first top surface and the second top surface are coplanar.

A first foam piece may be positioned over the first region. The first foam piece may have a first thickness. A second foam piece, separate from the first foam piece, may be positioned over the second region, the second foam piece having a second thickness different from the first thickness. In some cases, top surface of the first foam piece and a top surface of the second foam piece are coplanar.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
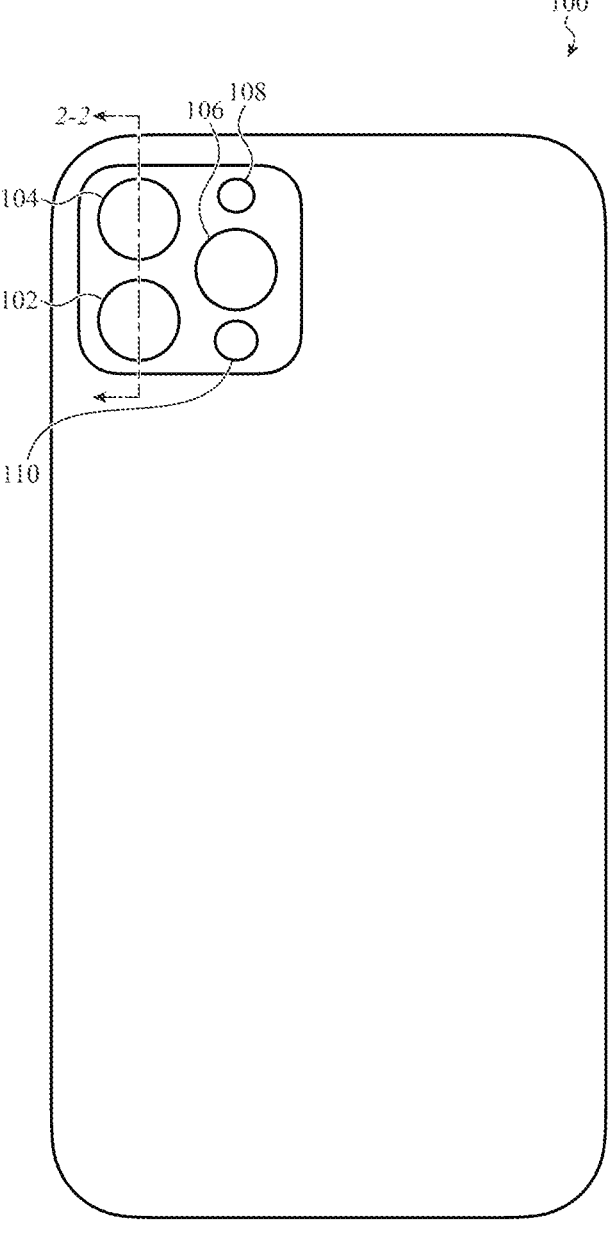
FIG. 1A depicts a plan view of an electronic device that may incorporate a chassis for mounting multiple cameras.

The use of cross-hatching or shading in the accompanying figures is provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to chassis for mounting multiple cameras. The chassis may be used for controlling the relative position of cameras in a multi-camera system (e.g., three-camera or two-camera configurations or the like) of an electronic device. As described herein, the chassis may be mounted within an electronic device, such as phones, tablets, laptops, AR/VR headsets, and so on.

The chassis may define multiple cavities, each sized to receive a corresponding camera of a camera system. Each camera mounted in a cavity of the chassis may have its own set of capabilities (e.g., a particular zoom levels, optical image stabilization functionality, autofocus functionality), and thus different cameras may have different dimensions and/or shapes. In some instances it may be desirable, when each camera is mounted to the chassis, for the cameras to have a specific relative positioning. For example, it may be desirable for a top surface of the lens barrel of each camera to be coplanar. Precise relative positioning between cameras may allow for accurate understanding of the relative perspective of different cameras when capturing images of a scene, and may also facilitate placement relative to other components of an electronic device.

The chassis described herein provides structural support to and alignment between multiple cameras while having a small form factor (e.g., a relatively small weight and space footprint). Specifically, the chassis may include an exterior surface having recessed regions with respect to other regions of the exterior surface and the chassis may also include an interior surface having recessed regions with respect to other regions of the interior surface. Each of the different regions define different surface heights that help with the alignment of the cameras with respect to each other.

In some examples, the chassis includes a top wall and sidewalls that cooperate to define the multiple cavities. The top wall includes a set of openings sized such that portions of the camera (e.g., the lens barrel) extend through the chassis while other portions of the camera are housed within the chassis. The top wall also includes regions defined by an exterior surface of the top wall, each of which having a different surface height. Configuring the top wall to have different surface heights may reduce the overall size and weight of the chassis while still facilitating alignment with other components of an electronic device. For example, the exterior surface of the top wall may include a first region that surrounds a second region, where the second region is recessed with respect to the first region. As another example, the exterior surface of the top wall may include a first region, a second region, and a series of discontinuous regions. The first region and the discontinuous regions may be coplanar while the second region is recessed with respect to its surrounding regions. The shape and size of each of the regions can be configured to reduce stress concentrations and cantilever-type loading on the chassis that might otherwise occur due to the disparate surface heights. In addition, the shape and size of the regions may help improve the alignment of the chassis against the electronic device (e.g., against a cover assembly).

The sidewalls of the chassis define the set of cavities that receive the cameras. For example, a chassis may include a shared sidewall that separates a first cavity from a second cavity. A first camera may be positioned in the first cavity, and a second camera may be positioned in the second cavity. In some of these examples, the top wall may include a first section and a second section located at either side of the shared sidewall. In this configuration, the first section defines an opening through the top wall (through which a lens barrel of the first camera may extend) and includes a region with a first surface height. The second section defines another opening through the top wall (through which a lens barrel of the second camera may extend) and includes a region with a second surface height that may be recessed with respect to the first surface height. The second section includes one or more additional regions that have the same surface height as the first surface height. At an interior surface of the top wall certain regions may also be recessed with respect to other regions to provide a particular alignment of the cameras.

These foregoing and other embodiments are discussed below with reference to FIGS. 1A-6B. However, those skilled in the art will readily appreciate that the detailed description given herein with respect to these figures is for explanation only and should not be construed as limiting.

As described herein, the chassis described here may be incorporated into a portable electronic device to position multiple cameras within the portable electronic device. FIG. 1A depicts an example portable electronic device 100 that includes a chassis for mounting multiple cameras. As depicted, the device 100 includes three rear-facing cameras, including a first camera 102, a second camera 104, and a third camera 106. These rear-facing cameras may be positioned behind a cover assembly and some or all of the cameras may be mounted to a single chassis that helps align and secure the camera with respect to the cover assembly and/or the exterior surface of the device. In some embodiments, the first camera 102, the second camera 104, and the third camera 106 may all be mounted to the same chassis. In other embodiments, two cameras (e.g., the first camera 102 and the second camera 104) may be mounted to the chassis while a third camera (e.g., the third camera 106) may be mounted to a different chassis or other mounting mechanism. Regardless of the number of cameras mounted to a single chassis, the configuration of the chassis helps align the relative positioning of the lens barrels of each of these cameras (e.g., such that a top surface of each of the lens barrels of each camera is coplanar). For example, the top surfaces of lens barrels of each of the first camera 102, the second camera 104, and the third camera 106 may be at the same height when they are mounted in the chassis. This may provide uniform spacing between the cameras and one or more components of the portable electronic device 100 (e.g., relative to one or more optical windows overlaying the first camera 102, the second camera 104, and the third camera 106).

In some instances, the device 100 may also include a flash module 108. The flash module 108 may provide illumination to some or all of the fields of view of the cameras of the device (e.g., the fields of view of the first camera 102, the second camera 104, and/or the third camera 106). This may assist with image capture operations in low light settings. Additionally or alternatively, the device 100 may further include a depth sensor 110 that may calculate depth information for a portion of the environment around the device 100. Specifically, the depth sensor 110 may calculate depth information within a field of coverage (i.e., the widest lateral extent to which the depth sensor is capable of providing depth information). The field of coverage of the depth sensor 110 may at least partially overlap the field of view of one or more of the cameras (e.g., the fields of view of the first camera 102, second camera 104, and/or third camera 106). The depth sensor 110 may be any suitable system that is capable of calculating the distance between the depth sensor 110 and various points in the environment around the device 100.

In some embodiments, the device 100 is a portable multifunction electronic device, such as a mobile telephone, that also contains other functions, such as PDA and/or music player functions. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1B:
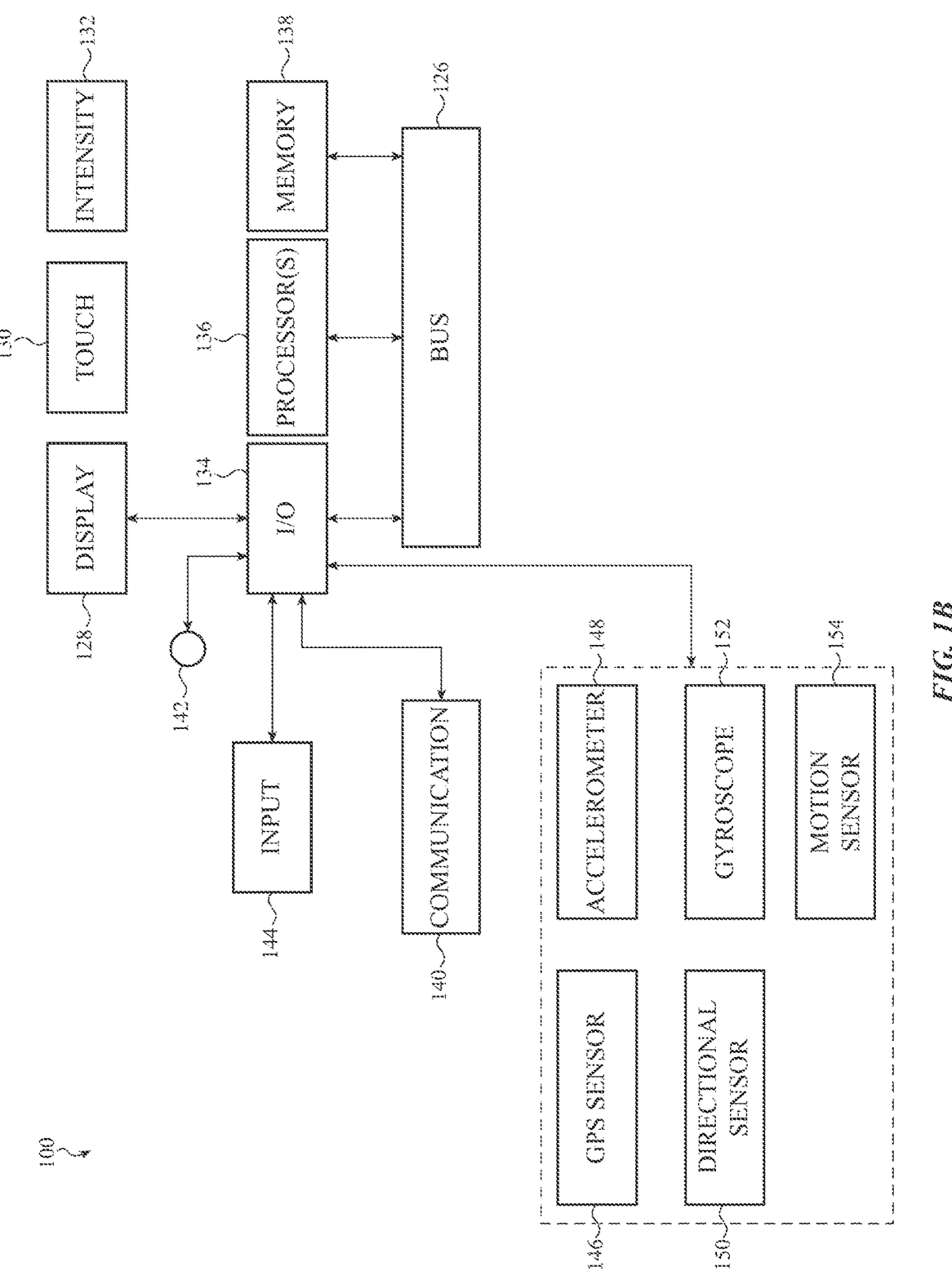
FIG. 1B depicts exemplary components of the device of FIG. 1A.

FIG. 1B depicts exemplary components of the device 100. In some embodiments, device 100 has a bus 126 that operatively couples an I/O section 134 with one or more computer processors 136 and memory 138. The I/O section 134 can be connected to display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. The device 100 can include input mechanisms 142 and/or 144. Input mechanism 142 is, optionally, a rotatable input device or a depressible and rotatable input device, for example. Input mechanism 142 is, optionally, a button, in some examples. The device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of the device 100 can include one or more non-transitory computer-readable storage mediums, for storing computer-executable instructions, which, when executed by one or more computer processors 136, for example, can cause the computer processors to perform one or more functions. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing of images using the cameras described herein. Device 100 is not limited to the components and configuration of FIG. 1B, but can include other or additional components in multiple configurations.

The electronic device depicted in FIGS. 1A-B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 2:
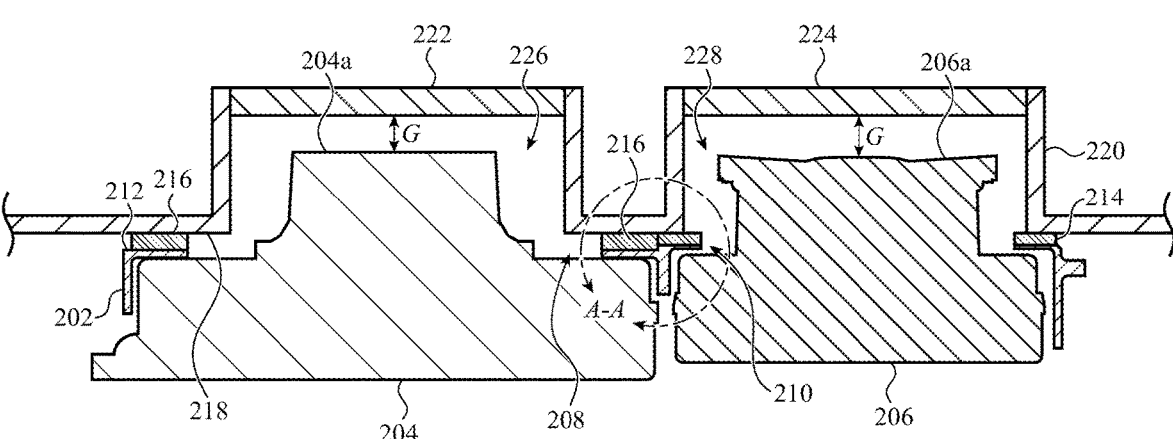
FIG. 2 depicts a cross-sectional view of a portion of the electronic device of FIG. 1, including a camera system with a chassis for mounting multiple cameras, taken along line 2-2 of FIG. 1A.

As discussed above, in some cases, electronic devices (e.g., device 100) include multiple cameras which are mounted to a chassis. The chassis and the cameras may be mounted to a cover assembly that defines an exterior surface of the electronic device. To facilitate accurate alignment, the portions of surface of the chassis resting against the corresponding surface or surfaces of the cover assembly are preferably flat. Additionally, foam pieces or other spacers may be positioned in between to compensate for small misalignments and manufacturing tolerances. FIG. 2 shows as cross-sectional view of a variation of an electronic device 200 as described herein (e.g., a variation of the electronic device 100 of FIG. 1A, taken along line 2-2). As depicted, the electronic device 200 includes a chassis 202 that secures a first camera 204 and a second camera 206 to the electronic device 200. In this configuration, the chassis 202 is configured to align a top surface 204a of the first camera 204 (which may be a top surface of a lens barrel of the first camera 204) and a top surface 206a of the second camera 206 (which may be a top surface of a lens barrel of the second camera 206), such that top surfaces 204a and 206a are coplanar.

The chassis 202 may define a first opening 208 through which a lens barrel of the first camera 204 extends. The lens barrel of the first camera 204 may define a first optical axis. Similarly, the chassis 202 may additionally define a second opening 210 through which a lens barrel of the second camera 206 extends. The lens barrel of camera 206 may define a second optical axis. The openings 208 and 210 may be dimensioned such the lens barrel of each of the cameras 204 and 206 can extend through the respective openings 208 and 210 while other components of the cameras are positioned behind a top wall of the chassis. For example, each of the cameras 204 and 206 may include a housing through which a lens barrel extends. The housings may at least partially enclose additional components of the cameras 204 and 206 (e.g., image sensors, filters, actuators, or the like). These housings may be, at least partially, positioned within one or more cavities defined by the chassis 202. The chassis, in some variations, may be coupled to an additional structure, which may cooperate with the chassis to enclose the housings of the cameras 204 and 206.

The chassis 202 includes a top wall that defines a top exterior surface 212 of the chassis 202. The exterior surface 212 of the chassis 202 may act as an interface between the cameras 204 and 206 and a portion of the electronic device 200 (e.g., a cover assembly 220) to set a relative position of the chassis 202 (and thereby the cameras 204 and 206) within the electronic device 200. The chassis 202 may directly contact the cover assembly 220, or may include one or more spacers that are positioned between the chassis 202 and the cover assembly 220. While the spacers are described herein as being foam pieces, it should be appreciated that the spacers may be formed from any suitable material or materials.

For example, a first foam piece 214 and a second foam piece 216 may be positioned over the exterior surface 212 of the chassis 202. These foam pieces 214 and 216 may help to correct for misalignments between the exterior surface 212 of the chassis 202 and an interface surface 218 of a cover assembly 220 that may result from minor manufacturing variations in these components. In addition, the foam pieces may provide shock absorbance and/or may act to provide a seal between the cover assembly 220 and the chassis 202 to help prevent dust or other contaminants from entering the housings of the first and second cameras 204, 206.

In some embodiments, the foam pieces 214 and 216 may have different thickness. The different thicknesses help accommodate the difference in surface heights of the exterior surface 212 of the chassis 202 such that the foam pieces 214 and 216 may collectively form a level surface that faces the interface surface 218 of the cover assembly 220. In other examples, the foam pieces 214 and 216 are positioned such that the upper surfaces thereof are not coplanar. For example, the foam pieces 214 and 216 may have a common thickness, but may be positioned at different heights (e.g., against different portions of the exterior surface 212 having different surface heights).

The cover assembly 220 may be configured to allow light to enter the electronic device 200, and thereby allow the first and second cameras 204, 206 to capture images. For example, the cover assembly 220 includes at least one optical window that is formed from a material (e.g., sapphire glass, tempered glass, or the like) that is transparent to one or more wavelengths of light imaged by the cameras 204, 206. For example, the cover assembly 220 may include two optical windows 222 and 224. As depicted, a first optical window 222 is positioned over the first camera 204 and a second optical window 224 is positioned over the second camera 206.

The cover assembly 220 may also define one or more cavities that at least partially surround portions of the lens barrel for each camera. For example, the cover assembly 220 of FIG. 2 defines a first cavity 226 that partially surrounds the lens barrel of the camera 204. A first end of the first cavity 226 may be defined by the first optical window 222, and the exterior surface 212 of the chassis 202 (and any intervening spacers) may seal a second end of the first cavity 226. Similarly, the cover assembly 220 defines a second cavity 228 partially surrounds the lens barrel of the second camera 206. The second optical window 224 defines a first end of the second cavity 228, and the exterior surface 212 of the chassis 202 (and any intervening spacers) may seal a second end of the second cavity 228. The cover assembly 220 may include any suitable materials (e.g., metal, ceramic, plastics, etc.) to define the walls of the first and second cavities 226, 228, as well as the interface surface 218 of the cover assembly 220. These materials may also form an outside surface of the electronic device. Although the first camera 204 and the second camera 206 may have different dimensions it may be desirable to position these cameras such that there is a common gap G between both i) the top surface 204a and the first optical window 222 and ii) the top surface 206a and the second optical window 224. The chassis described herein may facilitate this relative alignment. In some examples, the cover assembly 220 has a single window positioned over the first camera 204 and the second camera 206. In this configuration, the cover assembly 220 may define a single cavity that partially surrounds the lens barrel of camera 204 and the lens barrel of camera 206. In this example, the cover assembly 220 may contact the foam (and the chassis 202) at peripheral portions of the chassis 202. This configuration may simplify manufacturing and may result in a uniform outside surface for both cameras. As with the cover assembly with more than one cavity, the gap between the shared window and the top surface of the lens barrels may be the same for both cameras, 204 and 206.

Specifically, to achieve an accurate alignment of the cameras while reducing the overall size and weight of the chassis, the chassis may include stepped or recessed features along external and interior surfaces of the chassis. The shape, size, and location of the recessed features and other regions of the chassis helps with alignment of the chassis to the cover assembly and helps with decreasing stresses (e.g., cantilever-type loading) of the chassis when it is mounted to the cover assembly. FIG. 3A-3E depict an example of a camera system 300 with a chassis 302 having regions with different height along an exterior surface thereof. As depicted, the chassis 302 may include a top wall 304 and a set of sidewalls 306. In some embodiments, the top wall 304 and the sidewalls 306 may cooperate to define a cavity or multiple cavities (not shown) of the chassis 302.

In some cases, the top wall 304 and the sidewalls 306 are formed as separate elements that are fixedly attached (e.g., via welding) to form the chassis 302. In other configurations, the chassis 302 (including the top wall 304 and the sidewall 306) is formed from a single monolithic piece.

Figure 3A:
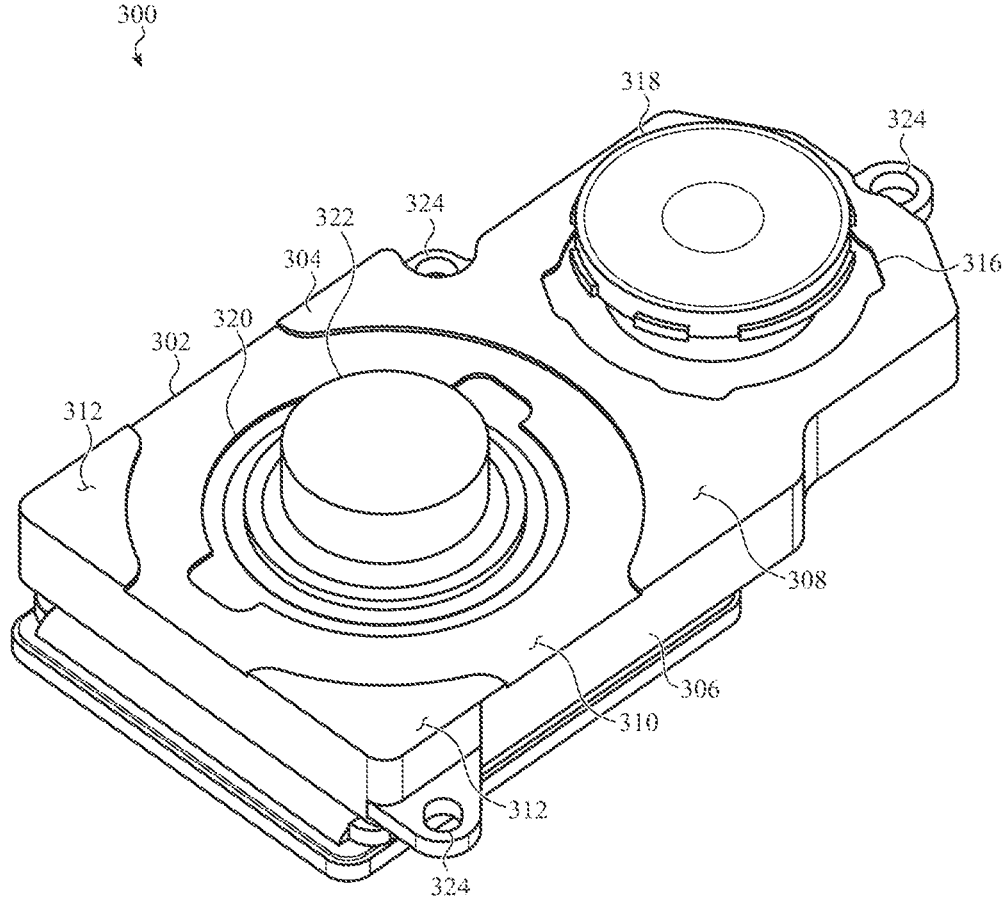
FIGS. 3A-3B depict a perspective and a plan view, respectively, of a variation of the camera system including the chassis for mounting multiple cameras.

The top wall 304 has an exterior surface that includes multiple different regions having different heights. For example, the exterior surface of the top wall 304 includes a first region 308, a second region 310, and one or more discontinuous regions 312 that are coplanar with the first region 308. The second region 310 is recessed with respect to both the first region 308 and to the discontinuous regions 312. Each discontinuous regions 312 may be separated from the first region 308 as well as any other discontinuous regions 312 by the second region 310, and may have any suitable relative positioning. For example, the first region 308 is shown in FIG. 3A as positioned at a first end of the chassis, and the discontinuous regions 312 are positioned at an opposite end of the chassis 302 (e.g., at different corners of the chassis 302).

When the camera system 300 is incorporated into an electronic device, the discontinuous regions 312 and the first region 308 may be positioned to interface a cover assembly (either directly or via a set of foam pieces). Because these surfaces are coplanar, they may be positioned against a flat surface (or set of coplanar surfaces) without an uneven (e.g., cantilever-like) loading force being applied to the chassis 302. Accordingly, the discontinuous regions 312 and the first region 308 may collectively act as an alignment surface of the chassis 302 to align the chassis 302 (along with the cameras mounted to the chassis) with respect to the cover assembly and the electronic device.

The first region 308 may define a first opening 316 that extends through the top wall 304. When a first camera 318 is mounted to the chassis 302, a lens barrel of the first camera 318 may extend through the opening 316. The first opening 316 may have any suitable size and shape that allows for lens barrel of the camera 318 to extend therethrough, and may be additionally sized to accommodate lateral movement of the lens barrel in instances where the lens barrel is laterally moveable (e.g., to provide optical image stabilization capabilities). In some instances, the first opening 316 may be further sized or shaped (e.g., with notches or the like) to allow for access to portions of the first camera 318 during assembly.

Similarly, the second region 310 may define a second opening 320 that extends through the top wall 304. When a second camera 322 is mounted to the chassis 302, a lens barrel of the second of camera 322 may extend therethrough. Similar to first opening 316, the second opening 320 may have any suitable size and shape as may be needed to accommodate the lens barrel (e.g., such that the lens barrel may extend through the second opening 320) of the second camera 322, as well as any other camera components, such as a portions of an actuator or the like, that may extend at least partially through the second opening 320.

In some variations, portions of the boundaries between the second region 310 and the first region 308 and the discontinuous regions 312 may follow a general contour of the second opening 320. For example, a portion of the boundary between the second region 310 and the first region 312 may be curved. The second region 310 may define one or more curved portions of the perimeter of the second opening 320 that are parallel to this curved boundary between the second region 310 and the first region 308. In these areas, the second region 310 may have a curved shape with a common thickness. Additionally or alternatively, one or more portions of the perimeter of the second opening 320 may be parallel with a boundary between the second region 310 and one or more of the discontinuous regions 312. In some cases, the second region 310 extends to a periphery of the top side 304 of the chassis 302. The boundary of the second region 310 may alternatively adopt any other shape as may be desired.

In some embodiments, the chassis 302 may also include one or more features to facilitate securing a position of the chassis 302 in the electronic device. For example, the chassis 302 may include tabs 324 that extend one or more of the set of sidewalls 306. The tabs 324 may define holes configured to receive a screw or other fastener, which may be used to couple the chassis 302 to another component within an electronic device. While the tabs 324 are shown as extending from the sidewall 306, other configurations of the chassis may have the tabs extending from the top wall (e.g., an interior or an exterior surface thereof) if so desired.

In some variations, the set of sidewalls 306 may define a set of cavities. Specifically, the set of sidewalls 306 may define a first cavity 332 and a second cavity 334. When the first camera 318 is mounted to the chassis 302, at least a portion of the first camera 318 is positioned in the first cavity 332. Similarly, when the second camera 322 is mounted to the chassis 302, at least a portion of the second camera 322 is positioned in the second cavity. The size and/or shape of the first cavity 332 may be different from that of the second cavity 334, which may facilitate mounting cameras having different sizes and/or shapes.

Figure 3B:
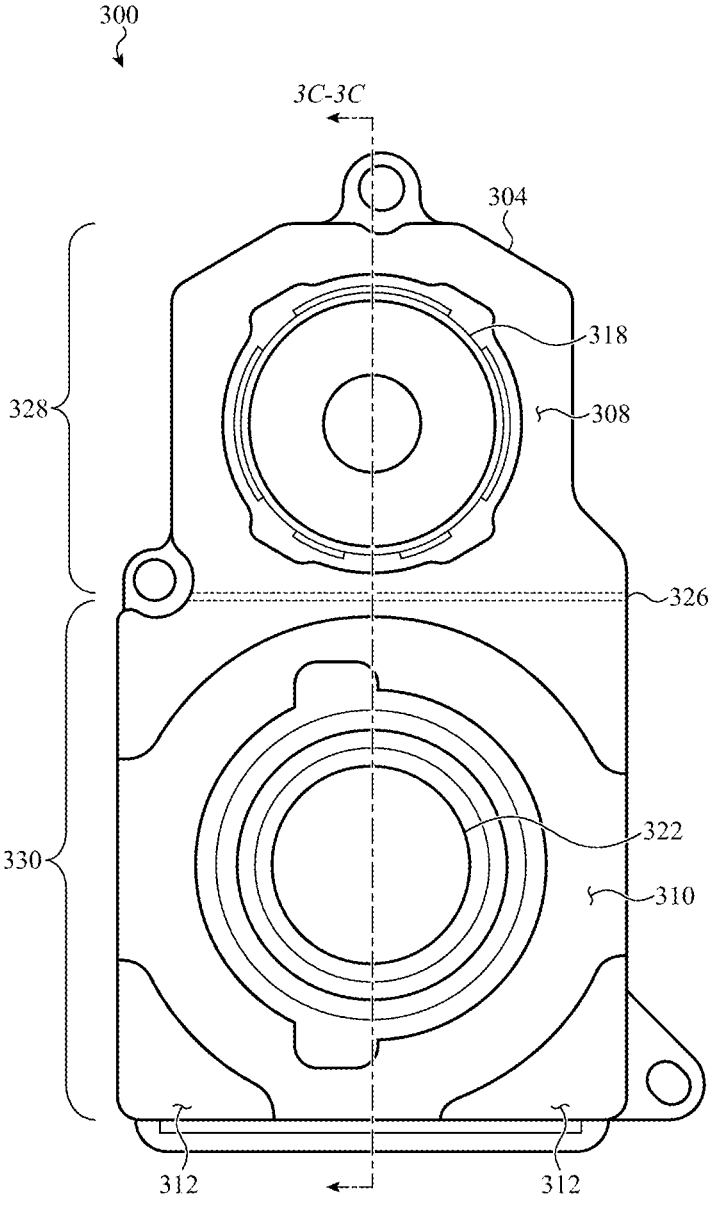
Figure 3C:
FIG. 3C depicts a cross-sectional view of the camera system along line 3C-3C of FIG. 3B.
Figure 3C:
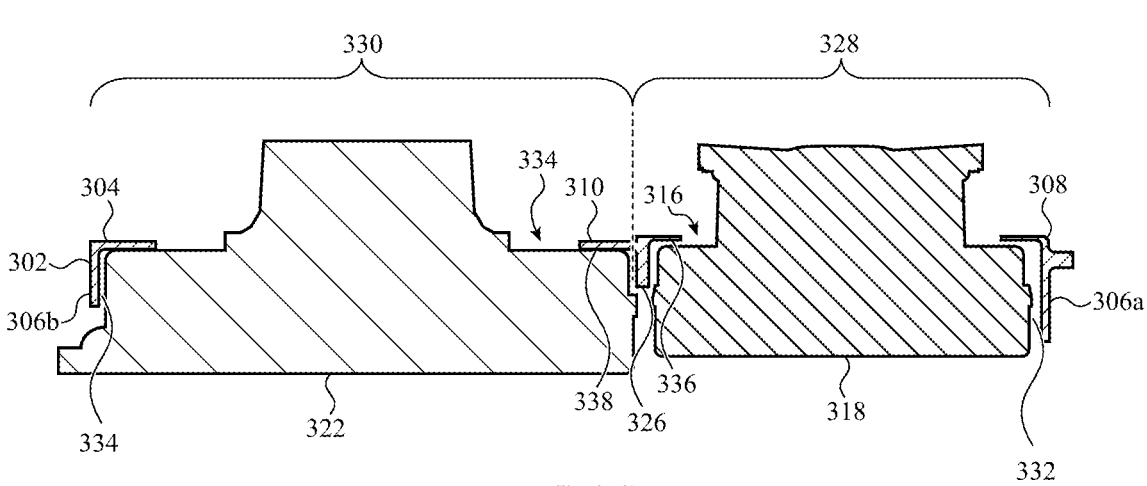

In these variations, the set of sidewalls 306 may include a set of peripheral sidewalls (e.g., including a first peripheral sidewall 306a and a second peripheral sidewall 306b) and a shared sidewall 326, where the shared sidewall 326 separates the first cavity 332 from the second cavity 334, such as depicted in FIG. 3C. The shared sidewall 326 may be perpendicular to the top wall 304. In some embodiments, the shared sidewall 326 may be thicker than some or all of the peripheral sidewalls. Additionally or alternatively, the peripheral sidewalls and/or the shared sidewall 326 may have different heights. For example, a height of the first peripheral sidewall 306a on the right side of the chassis 302 may be longer than a height of the second peripheral sidewall 306b on the left side of the chassis 302. Both of these peripheral sidewalls may have a longer height than the shared sidewall 326.

In these embodiments, the top wall 304 includes a first section 328 and a second section 330 that are positioned on opposite sides of the shared sidewall 326. Specifically, the first section 328 may be on a first side of the shared sidewall 326 and the second section 330 may be on a second side of the shared sidewall 326. Each of these sections may partially define the different regions of the exterior surface of the top wall 304. For example, the first section 328 includes at least one region of the exterior surface (e.g., a first portion of the first region 308) having a first surface height. The second section 330 includes at least one region of the exterior surface (e.g., a second portion of the first region 308 and/or the discontinuous regions 312) that has the first surface height, and at least one region of the exterior surface (e.g., the second region 310) having a second surface height that is recessed relative to the first surface height. In this way, the exterior surface of the top wall 304 includes regions with the first surface height on both sides of the shared sidewall 326. This may promote placement of the chassis 302 against other portions of an electronic device as described herein.

The top wall 304 defines an interior surface having one or more interior surface regions. For example, when the chassis 302 defines multiple cavities, the top wall 304 may define multiple interior surface regions, each of which at least partially define a boundary for a corresponding cavity. As an example, a first interior surface region 336 is located in the first section 328 and may be opposite the first region 308 of the exterior surface of the top wall 304. The first interior surface region may partially define the first cavity 332. Similarly, a second interior surface region 338 is located in the second section 330 and may be opposite the second region 310 of the exterior surface (as well as portions of the first region 308 and the discontinuous regions 312 of the exterior surface). The second interior surface region may partially define the second cavity 334.

When the cameras are mounted to the chassis 302, a portion of the first camera 318 may contact the first interior surface region 336 and a portion of the second camera 322 may contact the second interior surface region 338. The first interior surface region 336 and the second interior surface region 338 may be at different surface heights. In this configuration, the height of each camera at the top surface of its corresponding lens barrel can be controlled by the corresponding surface heights of the first interior surface region 336 and the second interior surface region 338. For example, the second interior surface region 338 may be recessed with respect to the first interior surface region 336. In this instance, the lens barrel of the first camera 318 may be shorter than the lens barrel of the second camera 322, but the cameras may be positioned (by virtue of contact with the first and second interior surfaces 336, 338) such that the lens barrels of these cameras are coplanar. It should be appreciated that in some instances, the first and/or second interior surface regions may each include multiple sub-regions having different surface heights.

In some variations, different portions of the top wall 304 may have different thicknesses. For example, the portions of the top wall 304 where the first region 308 of the exterior surface and the first interior surface region 336 overlap (e.g., within the first section 328) may be thinner than the portions of the top wall 304 where the second region 310 of the exterior surface and the second interior surface region 338 overlap (e.g., within the second section 330). Similarly, the portions of the top wall 304 where the first region 308 of the exterior surface and the second interior surface region 336 overlap (e.g., within the second section 330) may be thicker than the portions of the top wall 304 where the second region 310 of the exterior surface and the second interior surface region 338 overlap (e.g., also within the second section 330). Accordingly, the relative thickness of the top wall depends on the surface heights of the interior and exterior surfaces, which in turn may be determined by the shape, size, and desired relative placement of the cameras to be mounted to the chassis 302. In some embodiments, the chassis does not include the shared sidewall 326. In these variations, the chassis 302 may include a shared cavity such that multiple cameras may be mounted in the shared cavity. In other variations, the sidewall may include multiple non-contiguous sidewall portions that partially extend within the inside portion of the chassis 302 to provide structural rigidity to the chassis.

As depicted in FIG. 3C, the shared sidewall 326 may support a transition from the first region 308 to the recessed second region 310. This transition may have a chamfered or a fillet profile to reduce stress concentrations. In some cases, the location of the transition varies and may not be supported by sidewalls.

As discussed with respect to FIG. 2, the camera system 300 may include foam pieces or other compressible spacers that are placed over the exterior surface of the top wall 304 of the chassis 302. When the chassis is mounted to the electronic device, the foam at least partially compresses to help with alignment of the chassis with respect to the cover assembly and/or generate a seal between the chassis and the cover assembly. For example, FIGS. 3D and 3E show top and cross-sectional side views, respectively, of the camera system 300 with foam pieces positioned over the exterior surface of the chassis.

Figure 3D:
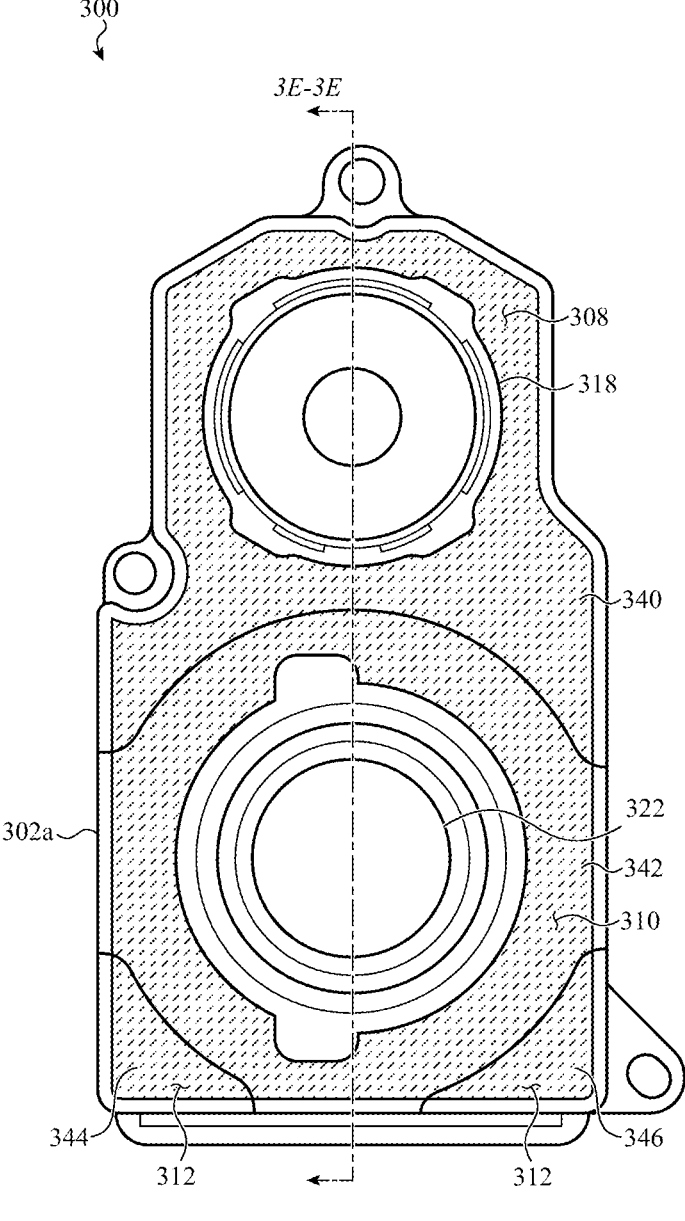
FIG. 3D depicts a plan view of the camera system of FIGS. 3A and 3B, further including foam pieces.
Figure 3E:
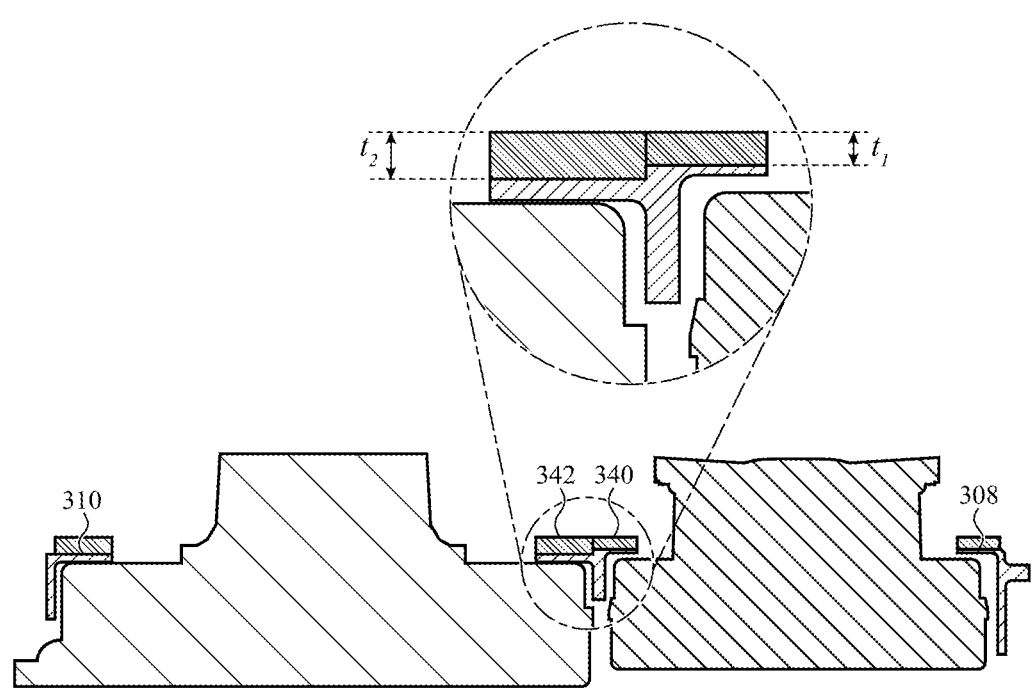
FIG. 3E depicts a cross-sectional view of the camera system of FIG. 3D along line 3E-3E.

As depicted in FIG. 3D, the camera system 300 includes multiple foam pieces that contact the regions described in FIG. 3B. A first foam piece 340 may be positioned over and in contact with the first region 308. A second foam piece 342 may be positioned over and in contact with the recessed second region 310. A third foam piece 344 may be positioned over and in contact with one of the discontinuous regions 312. A fourth foam piece 346 may be positioned over and in contact with another discontinuous region 312.

In some embodiments, the foam pieces may be positioned inward of a peripheral edge 302a of the chassis. In general, each of the foam pieces follow the general contour of each region and substantially covers (e.g., cover at least 80% of) the surface area of each region. With respect to each other, at an interface between pieces, each of the foam pieces may be in contact or there may be a lateral gap therebetween.

In some cases, the various foam pieces are configured such that corresponding top surfaces of each of the foam pieces are coplanar when contacting the exterior surface of the top wall 304. Due to the different surface heights of the regions of the chassis, each foam piece may a corresponding thickness such that the top surfaces of each foam piece are coplanar. For example, as shown in FIG. 3E, the first foam piece 340 may have a first thickness $t_1$ and the second foam piece 342 has a second thickness $t_2$. Because the second region 310 of the exterior surface is recessed relative to the first region 308 of the exterior surface, the second thickness $t_2$ may be larger than the first thickness $t_1$. This allows a top surface (e.g., the surface opposite the exterior surface of the top wall 304) of the first and second foam pieces 340, 342 to be coplanar, if so desired.

According to some variations, the second foam piece 342 may not substantially cover (e.g., cover less than 80% of) the second region 310. In still other variations, the camera system may not include the second foam piece 342, such that the second region 310 is not covered at all by a foam piece. In this configuration, the foam pieces may still be placed over the first region 308 and the discontinuous regions 312, thereby contributing the alignment between the chassis 302 and a cover assembly of an electronic device.

To further align the chassis 302 to the cover assembly, the first region 308 and the discontinuous regions 312 may undergo a common surface treatment such that the first region 308 and the discontinuous regions 312 have a common surface finish. For example, the first region 308 and the discontinuous regions 312 may be lapped together as part of a common lapping process. Lapping refers to a surface finishing operation where loose abrasive powders (e.g., aluminum oxide, jeweler's rouge, optician's rouge, emery, silicon, carbide, diamond, and the like) are used as the grinding agent at low speeds. Lapping the first region 308 and the discontinuous regions 312 as part of a common lapping process may help in making these components both flat and coplanar.

In some variations, a region of an exterior surface of the chassis may substantially surround a recessed region of the exterior surface of the chassis. FIGS. 4A-4D depicts a variation of a camera system 400 having a chassis 402 for mounting multiple cameras, in which a protruding first region 410a of the exterior surface of a top wall 404 of the chassis 402 at least partially surrounds a recessed second region 410b region of the exterior surface of the top wall

404. As with the chassis 302 of FIGS. 3A-3E, the chassis 402 may see a more uniform load when it is mounted to the cover assembly and cantilever-type loading is thereby reduced.

The chassis 402 may include the top wall 404 and a set of sidewalls. As with the chassis 302 of FIGS. 3A-3E, the chassis 402 may define a first cavity 426 and a second cavity 428. Specifically, the set of sidewalls (which include at least one peripheral sidewall 422 and a shared sidewall 424) at least partially define the first cavity 426 and the second cavity 428. The shared sidewall 422, which separates the first cavity 426 from the second cavity 428, divides the top wall 404 into a first section 406 and a second section 408 positioned on opposite sides of the shared sidewall 422. Each of these sections may partially define the different regions of the exterior surface of the top wall 404. For example, the first section 408 includes at least one region of the exterior surface (e.g., a first portion of the first region 410a) having a first surface height. The second section 410 includes at least one region of the exterior surface (e.g., a second portion of the first region 410a) that has the first surface height, and at least one region of the exterior surface (e.g., the second region 410b) having a second surface height that is recessed relative to the first surface height.

The first portion 406 of the top wall 404 defines a first opening 412 that extends through the top wall 404. The first opening 412 is positioned to extend through the first region 410a of the exterior surface of the top wall 404. The first opening 412 may be sized to receive a portion (e.g., a lens barrel) of a first camera 414 mounted to the chassis 402, such as described in more detail herein. The second portion 408 of the top wall 404 may define a second opening 416 that extends through the top wall 404. The second opening 416 is positioned to extend through the second region 410b of the exterior surface of the top wall 404. The second opening 416 may be sized to receive a portion (e.g., a lens barrel) of a second camera 418.

The first region 410a may at least partially surround the second region 410b to substantially surround the second opening 416. For the purpose of this discussion, the amount that a first component surrounds a second component is measured by the radial extent, expressed in degrees, to which the first component encircles a center of the second component. For example, in the variation shown in FIGS. 4A-4D, the first region 410a fully encircles (e.g., encompasses 360 degrees) of both the second region 410a and the second opening 416. In other instances, the first region 410a may partially surround (e.g., encircle fewer than 360 degrees of) the second opening 416. As used herein, a first component "substantially surrounds" a second component if it encircles a radial extent of at least 180 degrees of the second component. Accordingly, the first region 410a may substantially surround (e.g., encircle at a radial extend of at least 180 degrees of or at least 210 degrees of) the second opening 416. In some variations, at least a portion of a boundary 420 between the first region 410a and the second region 410b may follow the general contours of a corresponding portion of the perimeter of the second opening 416, such as described in more detail with respect to the chassis 302 of FIGS. 3A-3E.

In some embodiments, the first region 410a of the exterior surface of the top wall 404 may be processed using surface treatments such lapping, grinding, polishing, honing, stropping, sanding, or the like, which provide an improved flatness and roughness.

The top wall 404 of chassis 402 has an interior surface that includes one or more interior surfaces regions. For example, when the chassis 402 defines multiple cavities, the top wall 404 may define multiple interior surfaces regions, each of which at least partially define a boundary for a corresponding cavity. As an example, a first interior surface region 430 is located in the first section 406 and may be opposite part of the first region 410*a* of the exterior surface of the top wall 404. The first interior surface region may partially define the first cavity 426. Similarly, a second interior surface region 432 is located in the second section 408 and may be opposite the second region 410*b* of the exterior surface (as well a different portion of the first region 410*a* of the exterior surface). The second interior surface region may partially define the second cavity 428. The interior surface regions 430 and 432 may have different surface heights to control the relative positioning of cameras (e.g., a first camera 414 and a second camera 418) mounted to the chassis 402, such as described in more detail with respect to the chassis 302 of FIGS. 3A-3E. More specifically, a portion of the first camera 414 may contact the first interior surface region 430 when mounted in the first cavity 426, and a portion of the second camera 418 may contact the second interior surface region 432 when mounted in the second cavity 428.

Figure 4A:
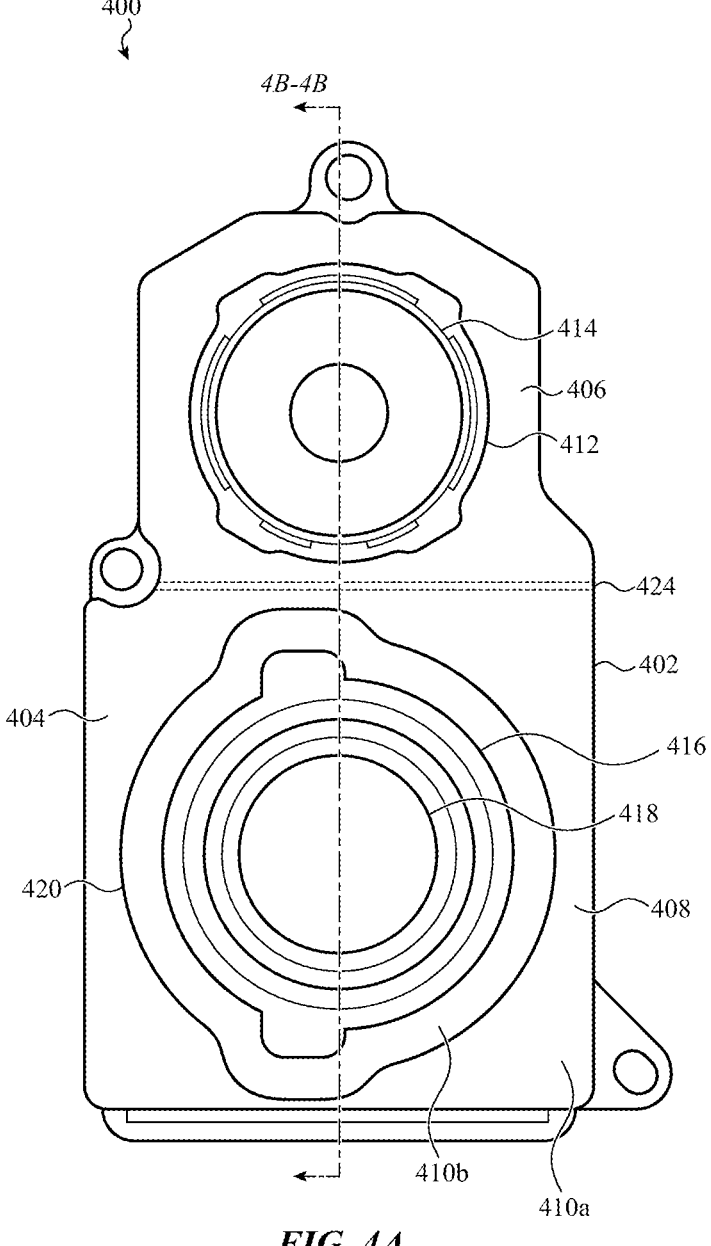
FIG. 4A depicts a plan view of a variation of the camera system including the chassis for mounting multiple cameras.
Figure 4B:
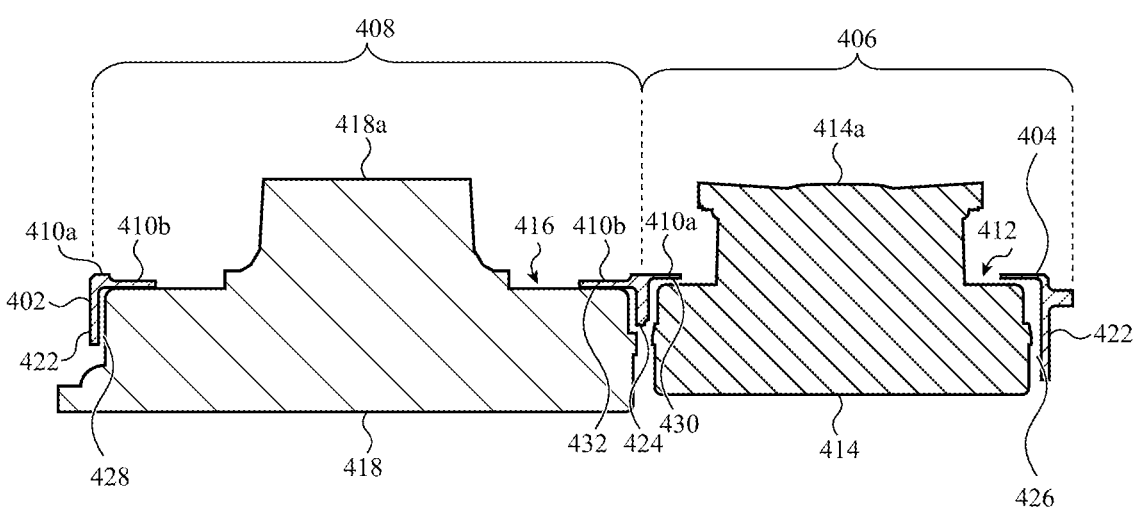
FIG. 4B depicts a cross-sectional view of the camera system along line 4B-4B of FIG. 4A.
Figure 4C:
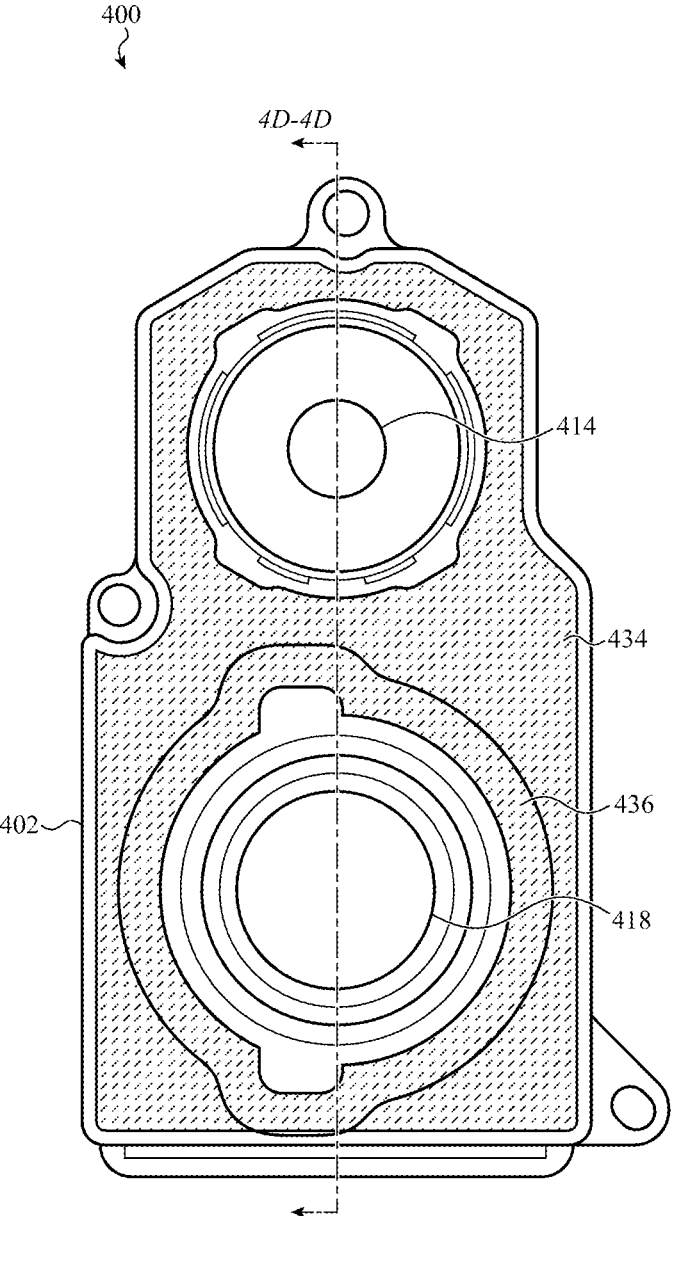
FIG. 4C depicts a plan view of the camera system including foam pieces.

In some embodiments, the chassis 402 may have foam pieces positioned over each of the first region 410*a* and the second region 410*b*, similar to the foam pieces described with respect to FIGS. 3D and 3E. FIG. 4C shows a top view of the camera system 400 including foam pieces positioned over the exterior surface of the top wall 404 of the chassis 402. A first foam piece 434 may be positioned to contact the first region 410*a* of the top wall 404 and a second foam piece 436 may be positioned to contact the second region 410*b* of the top wall 404. In some variations, the first foam piece 434 may substantially surround (partially or fully) the second foam piece 436. The first foam piece 434 may be positioned inward of a periphery of the top wall.

Figure 4D:
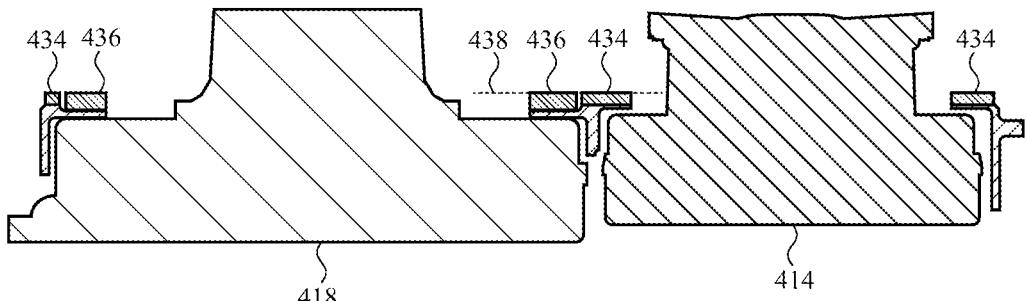
FIG. 4D depicts a cross-section view of the camera system along line 4D-4D of FIG. 4C.

FIG. 4D shows a cross-sectional view of camera system 400 along line 4D-4D of FIG. 4C. As depicted, foam pieces 434 and 436 are coplanar (in plane 438) and thereby collectively form a level surface. Due to this recessed surface height of the second region 410*b*, the second foam piece 436 may be thicker than the first foam piece 434 to compensate for the difference in surface heights of the top wall 404. In some configurations, the foam pieces 434 and 436 are the same thickness, thereby defining a stepped surface. In these instances, the first foam piece 434 may contact a portion of the cover assembly to help align the chassis with respect to the cover assembly, but (depending on the thickness of the second foam piece 436 and the compression of the first foam piece 434) may not directly contact the cover assembly.

Figure 5:
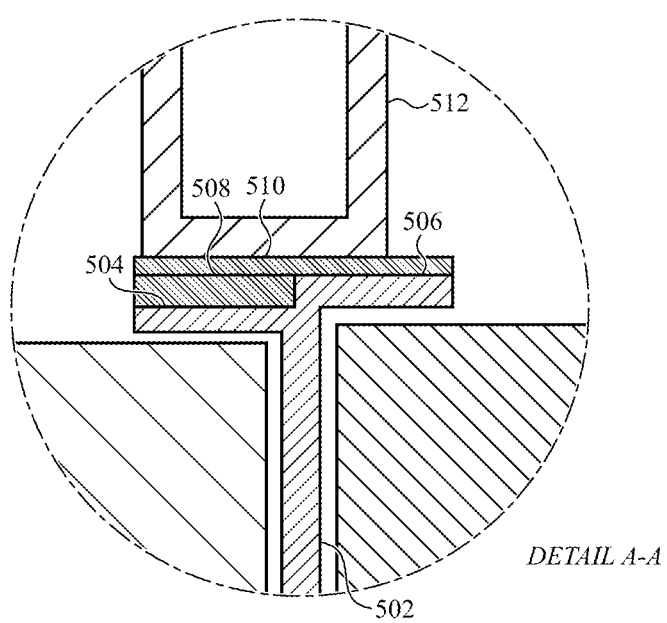
FIG. 5 depicts a detail view of a variation of the electronic device of FIG. 1A, taken along line A-A of FIG. 2.

While FIGS. 3D-3E and 4C-4D shows single foam pieces positioned over respective regions of the exterior surface of a top wall, other configurations are envisioned. For example, FIG. 5 shows a variation of a chassis that is represented by a detail view of section A-A of FIG. 2. The chassis 502 of FIG. 5 may be configured in any manner as described herein with respect to FIGS. 3A-4D and 6A-6B. As depicted, the chassis 502 may be incorporated into a camera system that includes multiple foam pieces, where at least two foam pieces are positioned to at least partially overlap.

The chassis 502 may include a top wall having an exterior surface. The exterior surface may include at least one recessed region 504 (such as the second region 410*b* of FIGS. 4A-4D) with a surface height that is lower compared to an adjacent region 506 (e.g., the first region 410*a* of FIGS. 4A-4D) of the exterior surface. A first foam piece 508 may be positioned over and in contact with the recessed region 504 of the exterior surface. The first foam piece 508 may have a height approximate to the difference between the surface height of the adjacent region 506 and the surface height of the recessed region 504. In this configuration, a top surface of the first foam piece 508 may be coplanar with respect to the adjacent region 506 of the exterior surface of the top wall.

A second foam piece 510 may be positioned at least partially over both the first foam piece 508 (and thereby positioned over the recessed region 504) and the adjacent region 506. The second foam piece 510 may be a unitary piece that covers most or all of the exterior surface of the top wall of the chassis 502. In this configuration, the second foam piece 510 provides a continuous surface of the camera system. Accordingly, the camera system may be incorporated into an electronic device such that a cover assembly 512 is placed in contact with the second foam piece 510. For example, a portion of the cover assembly 512 is shown as being positioned in contact with the second foam piece 510 over both the recessed region 504 and the adjacent region 506.

Figure 6A:
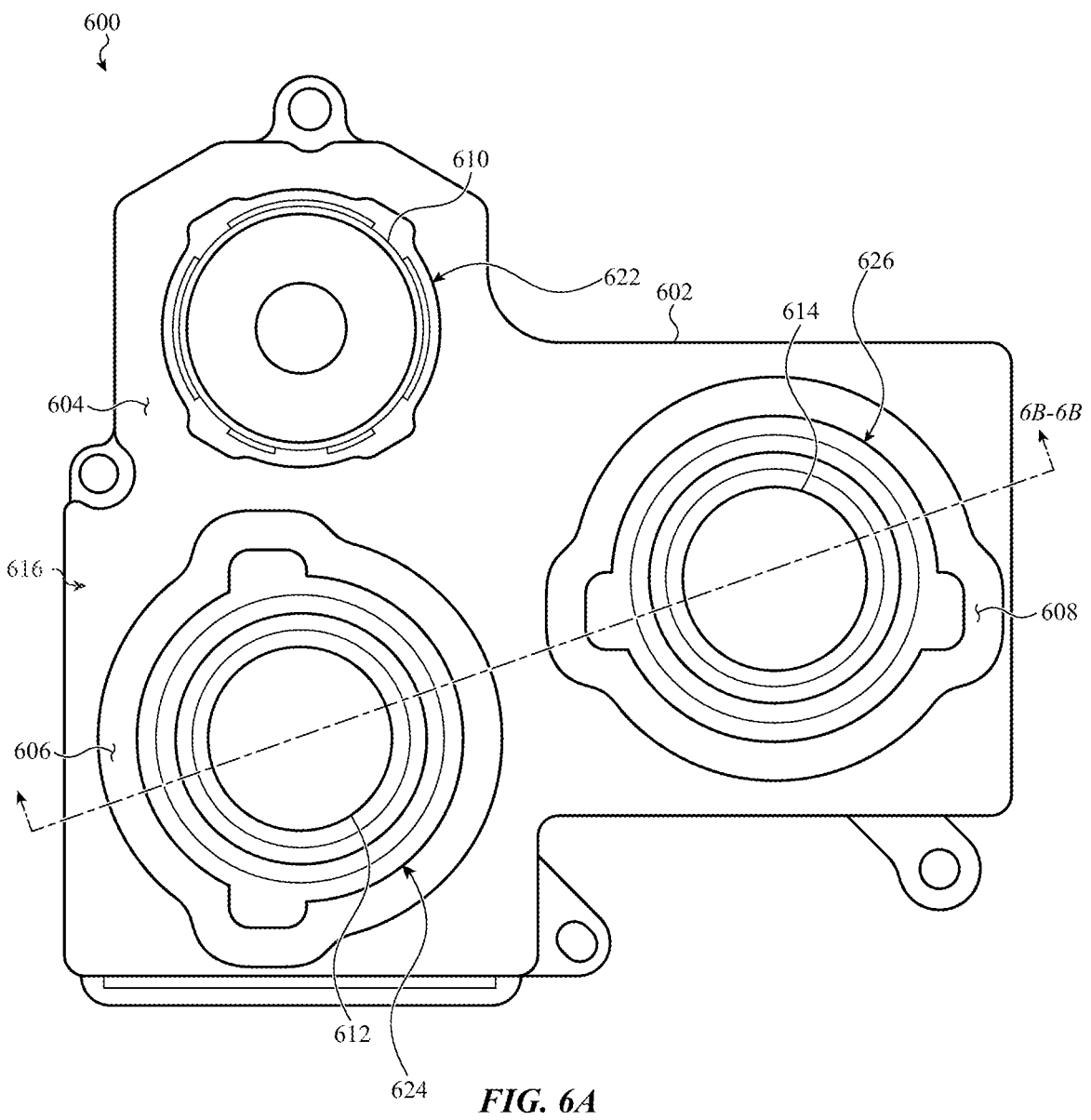
FIG. 6A depicts a plan view of a variation of a camera system including a chassis for mounting three cameras.
Figure 6B:
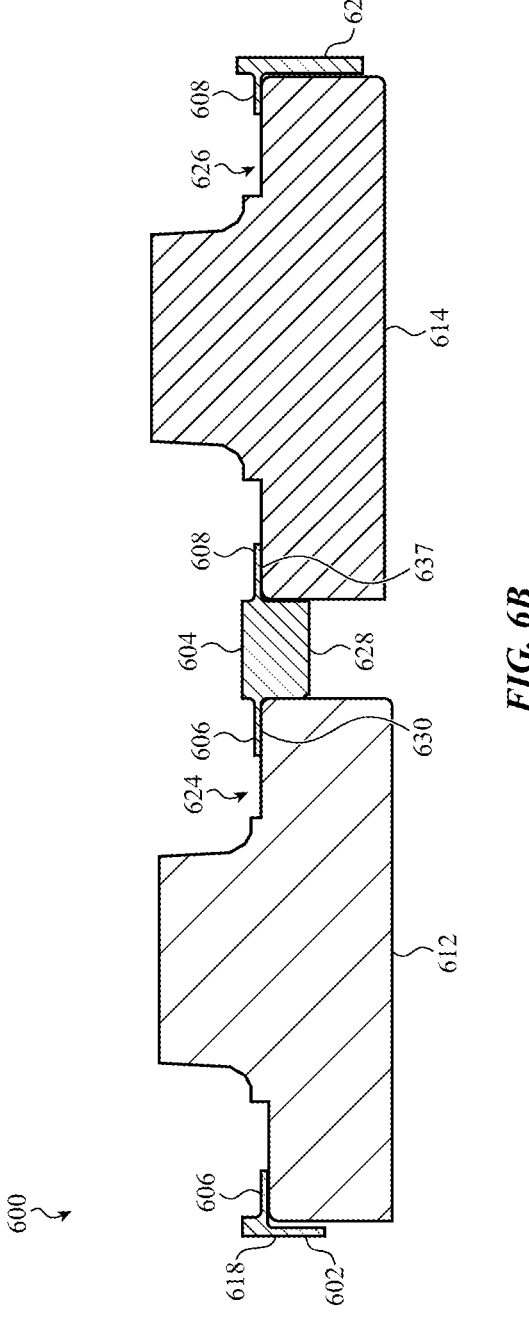
FIG. 6B depicts a cross-sectional view of the camera system along line 6B-6B of FIG. 6A.

While the embodiments discussed with respect to FIGS. 3A-4D show chassis configured to mount two cameras, the chassis described herein may be configured to mount three or more cameras as part of a camera system. FIG. 6A-6B depict an example of a chassis for mounting three cameras. FIG. 6A shows a top view of a camera system 600 with a three-camera chassis 602. As depicted, the chassis 602 may include multiple recessed areas along an exterior surface of the chassis to account for different configurations (e.g., different lens barrel heights) of the different cameras. In some embodiments, each of the three cameras (e.g., a first camera 610, a second camera 612, and a third camera 614) has a top surface of their respective lens barrels coplanar with respect to each other.

In some embodiments, the chassis 602 has a top wall 616 with an exterior surface having a first region 604, a second region 606, and a third region 608. The first region 604 may have a first surface height, the second region 606 may have a second surface height, and the third region 608 may have a third surface height, where some or all of these surface heights are different. In some cases, the second region 606 and the third region 608 may each be recessed with respect to the first region 604 (e.g., the first surface height may be higher than the second and third surface heights). In some embodiments, the second region 606 and the third region 608 may have different surface heights. In other embodiments, the second region 606 and the third region 608 may be coplanar.

In some variations, such as depicted in FIG. 6A, the first region 604 may fully surround the second and third regions 606 and 608. In this configuration, the first region 604 defines a portion of the exterior surface which may be placed against a cover assembly of the electronic device (either directly or via one or more intervening foam pieces or other spacers) and thereby aligns the chassis (and each of the three cameras) to the cover assembly. The continuous configuration of the first region 604 also reduces potential stress concentrations due to the recessed regions and/or prevents cantilever-type loading in the chassis. In other instances, the first region 604 may partially and substantially surround one or both of the second and third regions 606 and 608.

In the variation shown in FIG. 6A, the exterior surface of the top wall 616 defines a first opening 622, a second opening 624, and a third opening 626, each of which extends through the top wall 616 to accommodate a respective lens barrel of the first camera 610, the second camera 612, and the third camera 614. In the variation shown in FIG. 6A, the first region 604 of the exterior surface defines the first opening 622, the second region 606 defines the second opening 624, and the third region 608 defines the third opening 626. In other variations, the second region 606 and the third region 608 may be alternatively configured as a single contiguous region that defines both the second opening 624 and the third opening 626. Additionally or alternatively, the exterior surface of the top wall 616 of the chassis 602 may include one or more additional regions that are coplanar with but discontinuous from the first region 604 (similar to the discontinuous regions 312 of the chassis 302 shown in FIG. 3A-3E).

Additionally, the chassis 602 may be configured to define a set of cavities into which the first camera 610, the second camera 612, and the third camera 614 may be mounted. Accordingly, the chassis 602 may include a set of sidewalls that collectively at least partially define the set of cavities. For example, the set of sidewalls may include one or more peripheral sidewalls (e.g., peripheral sidewall 623) and one or more shared sidewalls (e.g., shared sidewall 628) that each separate an adjacent pair of cavities. For example, the set of cavities may define a first, second, and third cavity. A first shared sidewall (not shown) may separate the first and second cavities and a second shared sidewall (e.g. shared sidewall 628) may separate the third cavity from the first and second cavities.

These shared sidewalls may divide the top wall into different sections (e.g., a first sections that defines the first opening 622, a second section that defines the second opening 624, and a third section that defines the third opening 626). In the variations shown in FIGS. 6A and 6B, the first section includes a region of the exterior surface having a first surface height (e.g., a first portion of the first region 604) and the second section includes a region of the exterior surface having the first surface height (e.g., a second portion of the first region 604) and a region of the exterior surface having a second surface height recessed relative to the first surface height (e.g., the second region 606). Similarly, the third section includes a region of the exterior surface having the first surface height (e.g., a third portion of the first region 604) and a region of the exterior surface having a third surface height recessed relative to the first surface height (e.g., the third region 608).

The first camera 610, the second camera 612, and the third camera 614 may contact different interior surfaces regions of the top wall 616 (e.g., the first camera 610 may be mounted to a first interior surface region (not shown), the second camera 612 may be mounted to a second interior surface region 630 of the top wall 616, and the third camera 614 may be mounted to third interior surface region 637 of the top wall 616). The difference in surface heights between these interior surface regions may at least partially control the relative placement between the first camera 610, the second camera 612, and the third camera 614 as described previously. For example, the surface heights of the interior surface regions may be configured so that the top surfaces of some or all of the lens barrels of the three cameras are coplanar.

In some embodiments, the three-camera chassis 602 may include foam pieces overlayed over some or all of the regions of the exterior surface of the top wall 616, and may be configured in any manner such as described with respect to the camera systems of FIGS. 2-5. Similarly, the chassis 602 may include tabs or other features that facilitate securing the chassis 602 to a portion of an electronic, such as described in more detail herein.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A camera mounting system for mounting a first camera and a second camera, the camera mounting system comprising:
   a first foam piece;
   one or more foam pieces separate from the first foam piece; and
   a chassis comprising:
   a set of sidewalls comprising a shared sidewall; and
   a top wall having an exterior surface and an interior surface, wherein:
   the top wall and the set of sidewalls at least partially define a first cavity configured to receive at least a portion of the first camera and a second cavity configured to receive at least a portion of the second camera;
   the second cavity is separated from the first cavity by the shared sidewall; and
   the top wall comprises:
   a first section positioned on a first side of the shared sidewall and defining a first opening extending through the top wall, the first section comprising a first region of the exterior surface having a first surface height; and
   a second section positioned on a second side of the shared sidewall and defining a second opening extending through the top wall, the second section comprising:
   a second region of the exterior surface having a second surface height recessed relative to the first surface height, the second region defining the second opening;
   at least one additional region of the exterior surface having the first surface height;
   the first foam piece is positioned over the second region of the exterior surface; and
   the one or more foam pieces are positioned over the at least one additional region of the exterior surface.

2. The camera mounting system of claim 1, wherein:
   a first region of the interior surface is positioned within the first cavity;
   a second region of the interior surface is positioned within the second cavity; and
   the first region of the interior surface is at a different surface height than the second region of the interior surface.

3. The camera mounting system of claim 1, wherein a thickness of the top wall at the first region of the exterior surface is the same as the thickness of the top wall at the second region of the exterior surface.

4. The camera mounting system of claim 1, wherein the second opening extends through the second region of the exterior surface.

5. The camera mounting system of claim 4, wherein a distance between a peripheral edge of the second opening and a peripheral edge of the second region is the same along a perimeter of the second opening.

6. The camera mounting system of claim 1, wherein:
the shared sidewall is a first shared sidewall;
the set of sidewalls further comprise a second shared sidewall;
the set of sidewalls and the top wall cooperate to define a third cavity configured to receive at least a portion of a third camera, the third cavity separated from the first and the second cavity by the second shared sidewall;
the top wall further comprises a third section positioned on a first side of the second shared sidewall and defines a third opening extending through the top wall;
the third section comprises:
a third region of the exterior surface having a third surface height recessed with respect to the first surface height; and
at least one additional regions of the exterior surface having the first surface height.

7. The camera mounting system of claim 1, wherein:
each the first and the second cameras have different lens module heights and define respective top surfaces; and
the respective top surfaces of the first and the second cameras are coplanar.

8. A camera mounting system comprising:
a chassis comprising:
a top wall defining:
a first opening;
a second opening; and
an exterior surface and an interior surface opposite the exterior surface, the exterior surface defining:
a plurality of discontinuous regions having a first surface height; and
a recessed region having a second surface height, the second surface height recessed with respect to the first surface height, wherein the second opening is positioned within and defined by the recessed region;
a first foam piece positioned over the recessed region;
one or more foam pieces, separate from the first foam piece, positioned over each region of the plurality of discontinuous regions;
a first camera positioned to at least partially extend through the first opening; and
a second camera positioned to at least partially extend through the second opening.

9. The camera system of claim 8, wherein:
the first camera comprises a first lens module having a first height and extending through the first opening;
the second camera comprises a second lens module having a second height and extending through the second opening, the first height different from the second height; and
the first camera and the second camera are positioned such that a top surface of the first lens module is coplanar with a top surface of the second lens module.

10. The camera system of claim 9, further comprising:
a housing assembly comprising:
a first cover window positioned over the first camera; and
a second cover window positioned over the second camera, a respective top surface of the first and second cover windows are coplanar.

11. The camera system of claim 8, wherein an exterior surface of the first foam piece and respective exterior surfaces of the one or more foam pieces are coplanar.

12. The camera system of claim 8, wherein:
the interior surface defines:
a first region of the interior surface opposite the recessed region; and
a second region of the interior surface opposite a first discontinuous region of the plurality of discontinuous regions, the second region of the interior surface is recessed with respect to the first region of the interior surface.

13. The camera system of claim 8, wherein the first opening is positioned within a first discontinuous region of the plurality of discontinuous regions.

14. The system of claim 13, wherein the first discontinuous region and one or more additional discontinuous regions of the plurality of discontinuous regions have a common surface finish.

15. A camera system comprising:
a chassis configured to receive at least two cameras, the chassis comprising:
a top wall comprising:
a first portion defining:
a first region of an exterior surface of the top wall having a first surface height; and
a first opening defined by the first region, the first opening defined from the first surface height through the top wall; and
a second portion defining:
a second region of the exterior surface having a second surface height recessed with respect to the first surface height; and
a second opening defined by the second region, wherein the first region substantially surrounds the second opening;
a first foam piece positioned over the first region, the first foam piece having a first thickness;
a second foam piece, separate from the first foam piece, positioned over the second region, the second foam piece having a second thickness different from the first thickness such that a top surface of the first foam piece and a top surface of the second foam piece are coplanar;
a first camera mounted at least partially within the chassis and at least partially extending through the first opening; and
a second camera mounted at least partially within the chassis at least partially extending through the second opening.

16. The camera system of claim 15, wherein the first region fully surrounds the second region.

17. The camera system of claim 15, further comprising:
a housing assembly comprising:
a first window positioned over the first camera; and
a second window positioned over the second camera, wherein the housing assembly defines:
a first cavity having a first end defined by the first window, the first cavity sized to receive a portion of the first camera that extends through the first opening; and
a second cavity having a second end defined by the second window, the second cavity configured to receive a portion of the second camera that extends through the second opening.

18. The camera system of claim 17, wherein:
the first camera comprises a first lens module having a first height, the first lens module defines a first top surface of the first camera;
the second camera comprises a second lens module having a second height, different from the first height, the second lens module defines a second top surface of the second camera; and the first top surface and the second top surface are coplanar.

* * * * *